Feb. 10, 1970   D. P. HUMPHREYS ET AL   3,495,049
MAGNETIC TRANSDUCER WEAR INDICATOR
Filed March 8, 1968   3 Sheets-Sheet 1
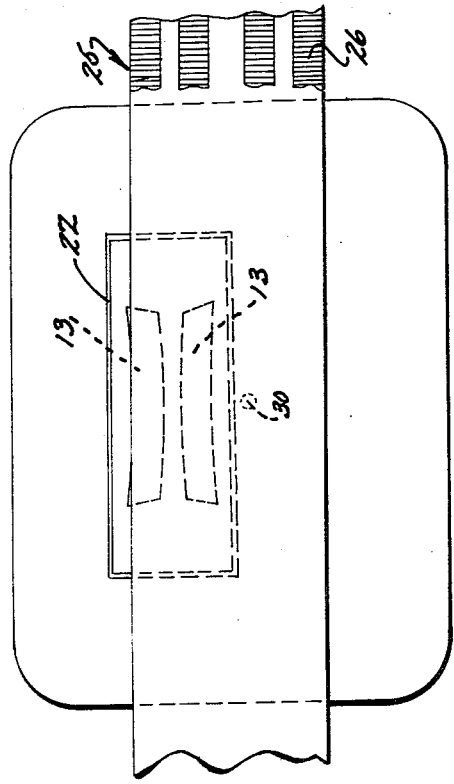
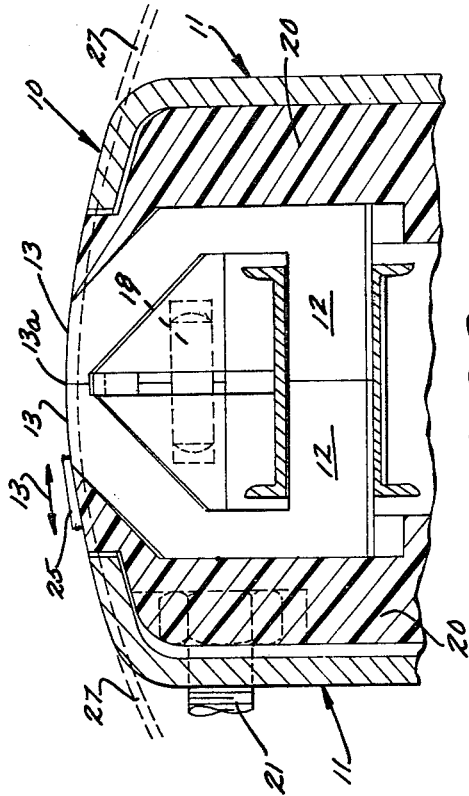
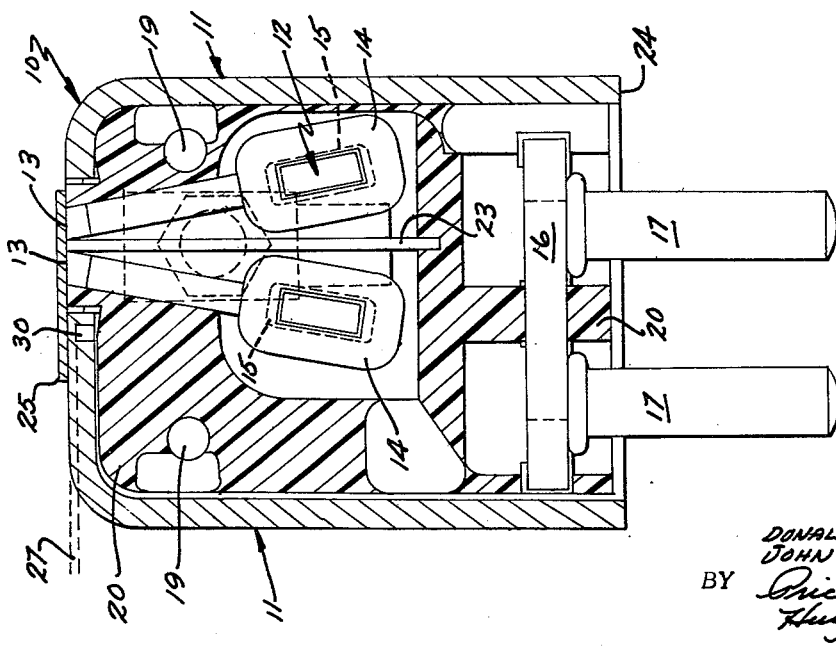
INVENTORS
DONALD P. HUMPHREYS
JOHN E. NELSON
BY
ATTORNEYS

INVENTORS
DONALD P. HUMPHREYS
JOHN E. NELSON

BY

ATTORNEYS

`United States Patent Office`

3,495,049
Patented Feb. 10, 1970

3,495,049
MAGNETIC TRANSDUCER WEAR INDICATOR
Donald P. Humphreys, Delton, and John E. Nelson, Hastings, Mich., assignors to Michigan Magnetics, Inc., Vermontville, Mich., a corporation of Michigan
Filed Mar. 8, 1968, Ser. No. 711,769
Int. Cl. G11b 5/00, 5/42; H01f 7/06
U.S. Cl. 179—100.2                                    9 Claims

ABSTRACT OF THE DISCLOSURE

A wear indicator particularly adapted for use in conjunction with magnetic recording, reproducing and erasing heads. The several embodiments of the invention are directed at structures which will provide a visual, electronic, etc. indication to the operator of the mechanism when the head has worn a predetermined amount due to the abasive action of the moving recording medium. The various embodiments of the invention illustrated, among other things, the embedding of a colored indicator segment a prescribed distance below the tape-abutting surface of a new transducer head, such embedding being done either in the shield or housing of the transducer. Several other embodiments are illustrated, additionally, wherefrom a visual and/or electronic signal may be obtained after the transducer head has worn a predetermined mount.

---

This invention relates to indicating devices and, more particularly, to such devices particularly adapted to indicate to the operator of a mechanism embodying a transducing head operating in conjunction with a moving recording medium the wear status and, thus, the current operating characteristics of the head. In its more specific embodiments, this invention relates to wear indicators particularly adapted to give visual and/or electronic indications to the operator of a magnetic transducing head when the head has worn down to such a point that the pole gaps therein are no longer satisfactorily spaced and, thus, when the recording and/or reproducing operation is not proceeding in optimum fashion.

Magnetic recording, reproducing and erase heads, referred to generically as magnetic transducer heads herein, are widely used for recording on, reproducing from or erasing magnetic recording media such as magnetic tapes. In the vast majority of systems utilized commercially, the recording medium is moved past the transducer head in sliding abutment therewith and, consequently, the head experiences substantial wear over the tape-abutting area because of the abrasive nature of the recording medium. This abrasive nature, ordinarily, is a result of the ferrous oxide particles on the record track, although similar abrading conditions can be encountered during utilization of other types of recording media.

The typical magnetic recording or reproducing head embodies, inter alia, a gap in the pole face which abuts the recording medium thereof. The physical dimensions of this gap are extremely critical to proper recording and/or reproducing. It is not uncommon, for example, to fabricate heads with a gap width of one ten-thousandth of an inch. Any widening or other distortion of the gap will result ordinarily in a marked degradation of recording and/or reproducing and, thus, require replacement or repair of the head.

The wear on the transducing head resulting from the abrasive action of the moving recording medium noted above, results eventually in a distortion of the gap width in transducer heads of the type described. The distortion, usually, results from a wearing down of the head and, thus, the pole faces to a point adjacent the lower portion of the facing surfaces thereof. While the degree or depth of this wear permissible in predetermined recording and/or reproducing environments may be readily calculated or optically measured with a calibrated high-power microscope, no apparatus or means has been available heretofore whereby the wearing of the head to a point where it no longer possesses satisfactory recording and/or reproducing characteristics could be ascertained easily by the operator.

Consider, for example, the utilization of such heads in a high-speed duplicating environment such as is found in the recording of tapes for utilization in automotive stereo equipment. Here the heads are used virtually continuously to record tape after tape of music or the like for eventual sale to owners of the automotive equipment. The heads are relatively expensive and, thus, cannot be thrown away economically unless they are functioning correctly no longer and, yet, it is not uncommon for rather large lengths of tape to be run past the recording head only to discover that the head had previously reached a wear condition rendering it no longer satisfactory for the recording function which it had been performing supposedly. In such a case, of course, relatively large quantities of production time are lost and, futher, it is often necessary to completely destroy the tape. Of greater concern, perhaps, is the fact that tapes which have been recorded using heads worn beyond optimal recording standards often escape detection and are marketed to the detriment of both the customer and the supplier.

It is an object of this invention, therefore, to provide transducer heads which are not subject to the disadvantages outlined above.

It is an object of this invention, more particularly, to provide heads of the type described embodying apparatus whereby the wear status resulting from the abrasive action of the moving recording medium may be quickly and easily determined by an operator, regardless of his experience in the recording field.

It is an object of this invention, thus, to provide a means whereby transducing heads of the type described may be utilized until fully expended and, yet, discarded prior to the time that the transducing characteristics thereof deteriorate beyond acceptable limits.

It is a further object of this invention to provide an indicator mechanism of the type described which may be easily and economically incorporated into conventional transducer heads during the fabrication thereof and which, for a relatively minimal cost, will markedly improve the economic characteristics of the head for the user thereof.

It is yet another object of this invention to provide a head of the type described embodying means for indicating the wear status thereof which have a built-in warning factor and, thus, which indicate the approaching unsatisfactory wear condition of the head prior to actual deterioration in the operating characteristics thereof, thus permitting replacement within a specified period thereafter rendering it unnecessary to stop the transducing process immediately.

These as well as other objects of this invention will be readily understood by those skilled in the art with reference to the following specification and accompanying figures in which:

FIG. 1 is a plan view of a typical transducer head with a typical recording tape positioned thereagainst in operative fashion;

FIG. 2 is a sectional side-elevational view of the transducer head;

FIG. 3 is a sectional front-elevational view of the transducer head;

Figure 4:
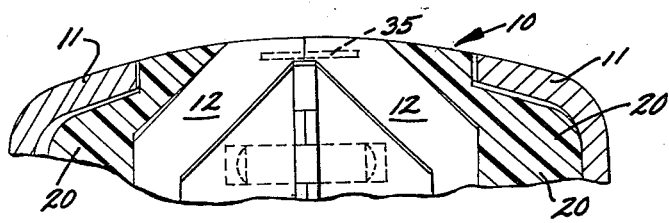
FIG. 4 is a fragmentary, front-elevational view, partially in cross section, of a transducer head illustrating a second embodiment of this invention.

Briefly, the instant invention is adapted for utilization in conjunction with a transducer head adapted to slidably contact a recording medium passing over a predetermined area thereof. Means are provided to impart relative motion between the head and the medium for recording, reproduction or the like, the motion causing the head to wear down at the contact area due to the abrasive action of the medium. Means are provided mounted within the head to indicate to the operator when the head has worn away a predetermined amount and, thus, when it is approaching or has reached a condition where it is no longer functioning with optimum efficiency.

Referring now to the figures, several preferred embodiments of this invention will be described in detail. Referring initially to FIGS. 1, 2 and 3, there is illustrated a more-or-less conventional recording head 10 comprising a surrounding shield or casing 11 which is fabricated, as is well-known in the art, from a high-permeability magnetic material such that it functions as a magnetic shield for suppressing the entry into the head of external magnetic fields. Within the shield or casing 11 are positioned pole structures 12, two such complete structures being provided in the two-track head shown. Pole structures 12 form exposed pole faces 13 separated by gaps 13a. The pole faces 13 are separated by a conventional cross-talk shield 23.

Positioned at the base of each of the pole structures 13 in conventional fashion is a bobbin 14 having a winding 15 suitably wrapped thereabout. The lower portion of the casing 11 has a terminal plate 16 positioned thereacross from which extend terminal pins 17. The terminal pins 17 are connected to the windings 15 as will be readily appreciated by those skilled in the art.

Positioned within casing or shield 11 in such a manner as to surround and position the transducer components is the housing 20 which may be fabricated in any one of a number of well-known manners. In the head illustrated, the transducer housing has been fabricated in two halves from a material such as nylon or the like and the transducer components positioned therein prior to its being joined together and placed within the shield 11. For this purpose, the housing 20 is provided with alignment pins 18 which are received by apertures 19 in the respective halves thereof. The alignment pins, of course, function to insure the proper positioning of the pole structure components with respect to one another during assembly of the apparatus.

The casing or shield 11 is provided with a pole face aperture 22 and a terminal pin aperture 24. The housing, after assembly, is slid and secured into the casing 11 through the terminal pin aperture 24 such that the pole faces 13 protrude through aperture 22. A conventional gap length stabilizer adjustment 21 is provided within the shield and housing. The recording medium, as illustrated in FIG. 1, may comprise a magnetic recording tape 25 having a series of four tracks 26 thereacross, the medium being carried across the face of head 10 in any conventional fashion.

The magnetic transducer described thus far is conventional and can be readily assembled by any skilled artisan. Prior to assuming the configuration illustrated in FIGS. 1, 2 and 3, the pole faces 13, surrounding sections of the housing 20 and slight portions of the casing 19 are ground away as is conventional in the art as a means of attaining the desired smoothly curved configuration and pole face structure of the tape-abutting surface.

Referring now to FIGS. 1 and 3 specifically, the transducer there shown is illustrated in its non-worn or new condition. The reference numerals 27 at the sides thereof delineate a predetermined wear depth which the transducer can experience without affecting its transducing properties. That is to say, the head may be worn via the abrasive action of the moving tape 25 a distance 27 across its entire arcuate surface without appreciably distoring the initial pole-gap dimensions. The distance 27, ordinarily, will be chosen such that the head will still be capable of transducing effectively for a number of hours, for example 40 hours, subsequent to wearing a depth equal to the distance 27. Such a choice, as will become apparent hereinafter, will permit replacement of the transducer within a reasonable time after as well as immediately upon the "replace indication" from the wear indicator means to be discussed in the following portions of this specification.

Referring again to FIGS. 1 through 3, there is positioned or embedded within the shield or casing 11 during fabrication thereof a bead-like quantity of colored material which, for example, may comprise an epoxy resin which has been dyed a shield-contrasting color such as red. The bead 30 is positioned to the side of the pole faces 13 in proximate alignment with the gasp therein and, additionally, below as viewed in FIG. 2, the tape abutting area thereof. The bead may be inserted into the shield 11, for example, by drilling an aperture to the prescribed depth from the interior thereof prior to the positioning of the component-containing housing 20 therein and filling it with the dyed epoxy.

As will be readily apparent from an examination of FIGS. 1 and 2, the contrasting color of the bead 30 will become visually discernible to the operator when the tape 25 has worn or abraded the transducer 10 to a depth equal to that indicated by the reference numeral 27. All that is necessary for the operator to do to insure recordings of consistent quality is to check the transducer face 10 each time a new tape is placed across the face of the apparatus to ascertain if a spot of red or other contrasting color is visible. If such is the case, and depending upon the built-in safety factor, he knows that it is time to remove and replace the transducer head 10.

The critical wear point on the head, ordinarily, will be that section adjacent the pole face gap 13a and, thus, satisfactory operating results may be achieved ordinarily by utilizing merely a bead of the colored material embedded in that area. In some environments, however, it may be desirable to provide a visual indication of the wear status of the head along the entire length of the pole faces thereof. Such may be accomplished easily, as illustrated in FIG. 4, by merely substituting an elongated bar 35 of dyed epoxy or other suitable material for the bead 30 illustrated in FIGS. 1 through 3. The bar 35, which can resemble a wire or the like in cross section, can be embedded within the shield 11 by routing or otherwise removing a section of the shield from the interior surface thereof in a manner similar to that discussed in connection with FIG. 1. The upper boundaries of the bar 35 as viewed in FIG. 4, of course, are positioned below the tape-abutting surface of the new head a distance equal to the amount of wear the head may experience without its operating characteristics being adversely effected. Again, as was discussed in connection with FIGS. 1 through 3, the positioning of the bar 35 may be such that the visual indication will appear at any desired time prior to an actual adverse effect upon the recording, reproducing or other characteristics of the head to permit changing thereof at a convenient time.

Figure 6:
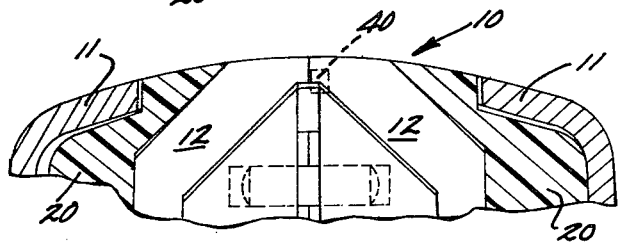
FIG. 6 is a fragmentary, front-elevational view, partially in cross section, of the transducer head shown in FIG. 5.
Figure 5:
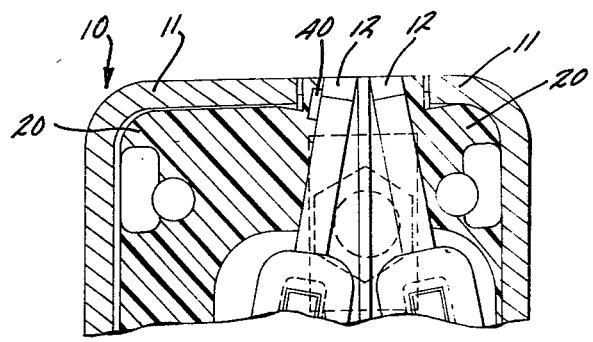
FIG. 5 is a fragmentary, side-elevational view, partially in cross section, of a transducer head illustrating a third embodiment of this invention.

In the embodiments illustrated in FIGS. 1 through 4, the indicator bead or bar is illustrated as being mounted within or embedded within the shield or outer casing 11 of the transducer head. Similar results can be obtained, as illustrated in FIGS. 5 and 6, by placing the bead-like quantity 40 of suitably dyed material such as epoxy or the like within the housing section 20 of the transducer head. As illustrated in these figures, thus, the bead 40 is positioned in lateral abutment with one of the pole members 12 and closely adjacent the pole face gap thereof. In the transducer construction illustrated, best results are obtained by positioning the bead 40 slightly to one side of the gap 13a since the housing section 20 is formed from two halves which join during assembly along a vertical line, as viewed in FIG. 6, which passes through the gap 13a.

In the embodiment of the invention illustrated in FIGS. 5 and 6, the positioning of the bead-like quantity of indicator material 40 is such that the color appears at the transducer face after a predetermined amount of erosion thereof and, thus, indicates that at that time or within some predetermined future time, it is desirable to replace the transducer head since it has worn to or is wearing to a point at which the operating characteristics thereof are or will be adversely effected. The bead may be positioned in any suitable manner, for example, by drilling up from the lower interior boundary of the particular housing section 20 within which it is to be mounted. It would be possible, additionally, to drill in directly from the head face, insert the bead at the prescribed depth and then either fill the remaining portion of the aperture or, for that matter, leave it open. In the latter case, the aperture must be kept relatively small in diameter so as not to adversely effect pole stability.

Figure 8:
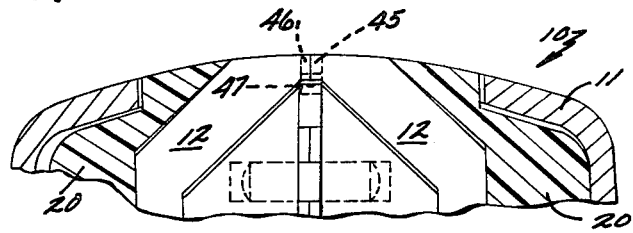
FIG. 8 is a fragmentary, front-elevational view, partially in cross section, of the head shown in FIG. 7.
Figure 7:
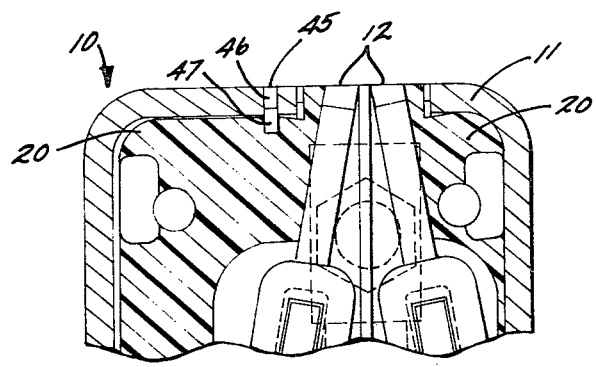
FIG. 7 is a fragmentary, side-elevational view, partially in cross section, of a transducer head illustrating a fourth embodiment of this invention.

In the embodiment of the invention illustrated in FIGS. 7 and 8, the indicator 45 comprises a relatively elongated member having two distinct segments 46 and 47. The segment 46, for example, can be green and the segment 47 red. As is shown best in FIG. 7, the segment 46 reaches upwardly to a point flush with the upper surface of the transducer head while the segment 47 depends into the housing section 20 thereof. As a recording tape is run over the surface of the head shown in FIGS. 7 and 8, it will slowly erode the head surface in the manner discussed previously. During that portion of the erosion wherein the operating characteristics of the head are not adversely effected, the operator will be able to observe the green spot from segment 46 by viewing the head face, thus indicating that the head is in satisfactory condition for operation. As the erosion approaches the point at which the operating characteristics of the head will be adversely effected, segment 46 will be completely worn away and, thus, the red from segment 47 will become visible at the face of the transducer. The red indication, of course, denotes that the head should be changed within a prescribed time period, the period depending upon the depth of the junction between the segments 46 and 47.

Figure 9:
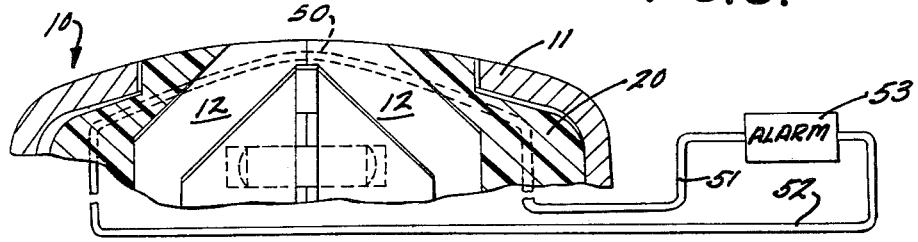
FIG. 9 is a fragmentary, front-elevational view, partially in cross section, of a transducer head and the alarm circuitry therefor illustrating a fifth embodiment of this invention.
Figure 10:
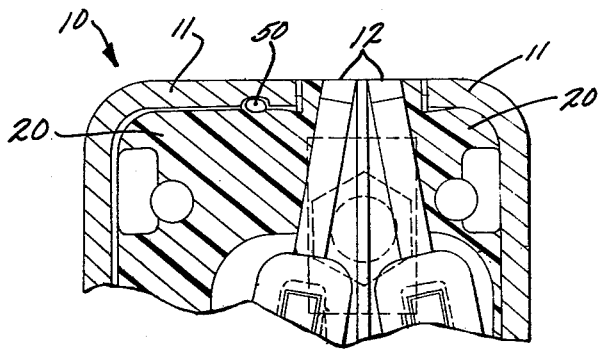
FIG. 10 is a fragmentary, side-elevational view, partially in cross section of the apparatus shown in FIG. 9.

The embodiments of this invention described thus far require a periodic visual inspection of the transducer face by the operator as a means of ascertaining the wear status of the head. While such a system will be perfectly satisfactory in many operating environments, other environments do exist wherein it is desirable to furnish a more positive indication regarding the wear status of the head such as, for example, an audible or blinking-light type of signal. Such an indicator system can be easily fabricated by utilizing the concepts of the instant invention and may comprise, as illustrated in FIGS. 9 and 10, a conductor member 50 embedded within the casing 11 of the head in such a fashion that it also will be eroded through or open circuited during erosion of the head by the recording medium. By properly positioning the conductor member 50, the open circuit will occur at a prescribed time prior to actual deterioration of the operating characteristics of the head. As illustrated in FIG. 9, the conductor 50 may be connected to an alarm system 53 by way of leads 51 and 52. Alarm system 53 may comprise, for example, a direct current source connected in series with the conductor and with a load such as the coil of a relay or the like. When the conductor 50 is separated due to the erosion of the transducer head 10, the relay will flip to its normally closed position and activate a buzzer, warning lights, or the like in any well-known fashion.

The electrical sensing system illustrated in FIGS. 9 and 10 requires for proper operation, of course, that the particular recording medium being utilized be electrically nonconductive. If such is not the case, the direct current travelling through the conductor 50 will merely travel, after separation of the conductor due to the erosion of the head, through the tape to the other severed extremity of the conductor and back through the alarm system 53, no indication being provided of the severed condition of the conductor 50.

Figure 11:
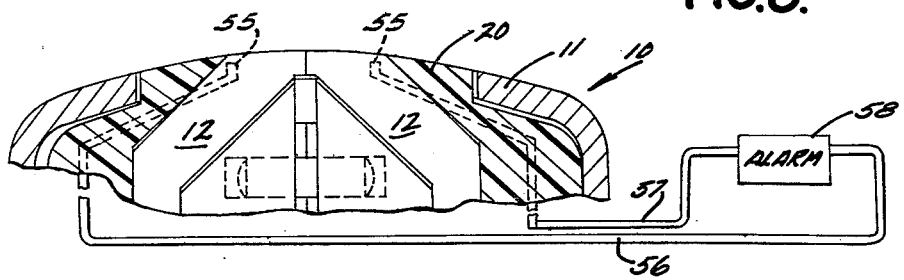
FIG. 11 is a fragmentary, front-elevational view, partially in cross section, of a transducing apparatus illustrating a sixth embodiment of this invention.

An indicator structure suitable for utilization in conjunction with an electrically conductive tape is illustrated in FIG. 11. This structure consists of a pair of contacts 55 buried in the head the prescribed wear depth. The contacts 55 conveniently, as illustrated, may merely be the extremities of leads 56 and 57 which are routed to an alarm system 58. When the tape has worn away or eroded the surface of the head a distance equal to the depth at which contacts 55 are buried, the tape will come into contact with each of them. This bridging of the contacts by the electrically conductive tape, of course, will complete a circuit through the alarm system 58. This circuit may be utilized to actuate a buzzer, light or the like as will be apparent readily to those skilled in the art.

While a number of alternately preferred embodiments of this invention have been described in detail, it will be apparent readily to those skilled in the art that numerous other embodiments may be conceived and fabricated without departing from the spirit of this specification and the accompanying figures.

The embodiments of the invention in which an exclusive property or privilege is claimed are defined as follows.

1. In a magnetic transducer head having pole faces with a gap therebetween, said head being adapted to slidably contact a recording medium over a predetermined area thereof, operation of the head requiring relative motion between the head and said medium whereby said head is eroded away at said area due to the abrasive action of said medium, the improvement comprising: means mounted within said head at a depth near that at which the head, when eroded thereto, will no longer perform satisfactorily for providing an indication to the operator thereof that the head is eroded away to such an extent that it should be replaced, said providing means providing such indication prior to the time that said head is eroded away to such an extent as to be incapable of transducing in an acceptable manner, said means being positioned such as to be slidably abutted eventually by said medium due to the erosion of said head and thus provide said indication.

2. The structure as set forth in claim 1 wherein said providing means provides a visual indication of the depth of erosion of said head.

3. The structure as set forth in claim 1 wherein said providing means provides an electrical indication of the depth of erosion of said head.

4. The structure as set forth in claim 1 wherein said head includes an exterior shield and an interior component positioning housing, said providing means being mounted within said housing.

5. The structure as set forth in claim 1 wherein said head includes an exterior shield and an interior component-positioning housing, said providing means being mounted within said shield.

6. The structure as set forth in claim 2 wherein said providing means comprises a quantity of material of a color contrasting to the color of the surrounding head material, said indication being provided when said quantity of material becomes visible at said area.

7. The structure as set forth in claim 6 which further comprises another quantity of material of a different color also contrasting with the color of the surrounding head material, said other quantity extending from the surface of the said predetermined area of a non-eroded head to said predetermined depth to provide an indication that the head is in satisfactory operating condition when visible.

8. The structure as set forth in claim 3 wherein said medium is electrically non-conductive and wherein said providing means includes a continuous conductor mounted within said head, said conductor being adapted to be worn through by the abrasive action of said medium, said providing means further including means for sensing the continuous and worn-through states of said conductor.

9. The structure as set forth in claim 3 wherein said medium is electrically conductive and wherein said providing means includes a set of spaced contacts mounted within said head, said contacts being adapted to be bridged by said medium when said head has been worn away to said predetermined depth, said providing means further including means for sensing the bridged and non-bridged states of said contacts.

References Cited

UNITED STATES PATENTS

| | | | |
|---|---|---|---|
| 2,493,466 | 1/1950 | Smith | 274—38 |
| 3,211,843 | 10/1965 | Dundovic et al. | 179—100.2 |
| 2,152,943 | 4/1939 | Wilson. | |
| 2,856,495 | 10/1958 | Chittum et al. | |
| 3,015,950 | 1/1962 | Doctor et al. | |
| 3,056,380 | 10/1962 | White. | |
| 3,138,224 | 6/1964 | White. | |
| 3,182,153 | 5/1965 | Postal. | |
| 3,236,096 | 2/1966 | Macatician et al. | |

BERNARD KONICK, Primary Examiner

J. RUSSELL GOUDEAU, Assistant Examiner

U.S. Cl. X.R.

29—603; 73—86; 274—4; 340—174.1; 346—74